United States Patent [19]

Edmondson et al.

[11] Patent Number: 5,064,612

[45] Date of Patent: Nov. 12, 1991

[54] INHIBITOR TREATMENT PROGRAM FOR CHLORINE DIOXIDE CORROSION

[75] Inventors: James G. Edmondson, Conroe; E. Paul Holder, Austin, both of Tex.

[73] Assignee: Betz Laboratories, Inc., Trevose, Pa.

[21] Appl. No.: 638,484

[22] Filed: Jan. 4, 1991

Related U.S. Application Data

[62] Division of Ser. No. 369,162, Jun. 21, 1989, Pat. No. 4,994,195.

[51] Int. Cl.$^5$ .............................................. C23F 11/04
[52] U.S. Cl. .................................... 422/12; 252/8.555; 252/389.23; 252/389.53; 252/400.23; 252/400.53; 422/15; 422/17; 422/18
[58] Field of Search ..................... 422/12, 15, 17, 18; 252/389.23, 389.53, 400.23, 400.53, 8.555

[56] References Cited

U.S. PATENT DOCUMENTS

| | | | |
|---|---|---|---|
| 4,077,879 | 3/1978 | Smeck | 210/62 |
| 4,552,665 | 11/1985 | Ralston et al. | 210/697 |
| 4,640,818 | 2/1987 | Grierson et al. | 422/15 |
| 4,717,499 | 1/1988 | Chen | 252/181 |

OTHER PUBLICATIONS

Prues et al., "Chemical Mitigation of Corrosion by Chlorine Dioxide in Oil Field Water Floods", Materials Reference, May 1985.

*Primary Examiner*—Robert J. Warden
*Assistant Examiner*—Timothy M. McMahon
*Attorney, Agent, or Firm*—Alexander D. Ricci; Gregory M. Hill

[57] ABSTRACT

A composition and methods for use in oilfield waterflood systems are disclosed. The composition is comprised of a phosphonate, a copolymer, and a permanganate and is effective at inhibiting the corrosion of metallic systems in petroleum oilfields caused by chlorine dioxide. Methods of use of phosphonate and permanganate alone are also disclosed. Chlorine dioxide is used in oilfield waterflood systems to control sulfides and sulfate reducing bacteria. However, chlorine dioxide is highly corrovive to the metallic components in the processing equipment of an oilfield system. The most effective system currently used to inhibit corrosion caused by chlorine dioxide comprises chromates. However, chromates are highly toxic and their use throughout the country is becoming increasingly restricted.

The use of a composition comprised of 1-hydroxyethylidene diphosphonic acid, a compolymer comprised of acrylic acid/allyl hydroxy propyl sulfonate ether and potassium permanganate has proved to be more effective than chromates as a chlorine dioxide corrosion inhibitor without the serious toxicological effects caused by the use of chromates.

7 Claims, No Drawings

INHIBITOR TREATMENT PROGRAM FOR CHLORINE DIOXIDE CORROSION

This is a divisional of application Ser. No. 07/369,162 filed June 21, 1989 now U.S. Pat. No. 4,994,195.

FIELD OF THE INVENTION

The present invention relates to water systems particularly those systems used in conjunction with the petroleum industry. Specifically, this invention is most useful in oilfield waterflood systems.

BACKGROUND OF THE INVENTION

Removal of petroleum oil from the ground includes cycling and recycling water in order to generate flood conditions commonly called oilfield waterfloods. This augments oil output from a well. Water used in such systems contains undesirable sulfide compounds, such as hydrogen sulfide and sodium sulfide. Also present are organisms which feed upon the sulfate present in the water. These organisms are commonly referred to as sulfate reducing bacteria (SRB). Excessive generation of both the sulfides and sulfate reducing bacteria results in an undesirable contamination problem.

Presently, chlorine dioxide is commonly used to control excessive buildup of sulfide and sulfate reducing bacteria in these systems. This compound is generated on-site and is usually slug-fed. However, one serious drawback to this treatment method is the fact that chlorine dioxide is very corrosive to the various metals used in oil field processing system equipment. Consequently, numerous attempts have been made to control chlorine dioxide induced corrosion in these systems. Presently, the most effective and most commonly used corrosion inhibition program includes the addition of chromates.

In order to minimize corrosion of carbon steel equipment in an oilfield waterflood system, sodium bichromate is fed concurrently with the chlorine dioxide. However, chromates are coming under increasing scrutiny due to their unacceptable toxicity. At present, one state, California, has already restricted the use of chromium due to its toxic effect on the environment.

It has therefore become necessary to develop a composition which will provide the desirable attributes of inhibiting the corrosion of metallic surfaces caused by the presence of chlorine dioxide without the toxic side effects of the previously described chromate systems.

PRIOR ART

U.S. Pat. No. 4,552,665, Ralston et al., discloses a process for inhibiting the precipitation of dissolved manganese ions and their reaction products in aqueous media. The composition disclosed by the patentees consists of a copolymer comprised of an unsaturated carboxylic acid or salt thereof and an unsaturated sulfonic acid or salt thereof. Additionally, the copolymer is shown to be effective in combination with polycarboxylicates, phosphonates and phosphates.

U.S. Pat. No. 4,640,818, Grierson et al., describes a process for inhibiting corrosion of metals in water conducting systems. The patentees disclose a composition consisting of an aminoalkalinephosnhonic acid or derivative thereof used in combination with a manganese compound sufficient to provide a source of manganese ions.

U.S. Pat. No. 4.077.879. Smeck discloses a process for treating water or water/petroleum systems contaminated with undesirable sulfide compounds or sulfate reducing bacteria (SRB). The patentees teach that the addition of chlorine dioxide to these systems will reduce the levels of undesirable sulfides and control the excessive growth of SRB.

In the May 1985 issue of the periodical Materials Performance, in an article by Prues. et al. entitled, *Chemical Mitigation of Corrosion by Chlorine Dioxide in Oil Field Water Floods*, the effect of chlorine dioxide as a bacteriocide useful in the treatment of controlling sulfate reducing bacteria from these environments is disclosed. The authors also discuss the corrosive effect that chlorine dioxide has on the metallic processing equipment. They advise that an effective chlorine dioxide program should also take into account chlorine dioxide corrosion inhibition. Testing was conducted with multiple inhibitors. In general, chromate yielded the best results at $ClO_2$ inhibition. Permanganate proved to he most ineffective at inhibiting $ClO_2$ corrosion when chlorite was the precursor of the chlorine dioxide. Furthermore, if chlorate was the generating solution, high levels of permanganate actually induced greater corrosion.

DETAILED DESCRIPTION OF THE INVENTION

The present invention is directed for use in water systems, especially water handling systems in the petroleum industry known as oilfield waterfloods. In these systems, sulfate reducing bacteria (SRB) and sulfides are present. In order to contain their proliferation, chlorine dioxide is added for this purpose. However, chlorine dioxide is highly corrosive to the metallic components used in oilfield equipment. Chromates have been and are recognized as successful chlorine dioxide corrosion inhibitors. However, chromates are also undesirable because of their high toxicity.

The instant invention provides a more effective chlorine dioxide corrosion inhibitor than conventional and potentially toxic chromate treatment programs. It has been discovered that the addition to the water system of a permanganate or a phosphonate, independently and separate from the $ClO_2$, or a composition comprised of permanganate, phosphonate and a copolymer provide unexpectedly superior corrosion inhibiting properties. The copolymer consists of the repeat units of acrylic acid and allylhydroxypropyl sulfonate ether (AA-/AHPSE). The composition of the copolymer is disclosed in U.S. Pat. No 4,717,499, Chen, the contents of which are incorporated herein by reference. The MW ratio of the AA/AHPSE repeat units is from about 30:1 to 1:20 and preferably 10:1 to. 1:5. The preferred phosphonates are those which do not contain nitrogen, for example, 1-hydroxylethylidene diphosphonic acid (HEDP) or salt thereof. The permanganate ion may be derived from a source such as, for example potassium or sodium permanganate.

The unexpected effect of the instant invention will become apparent after reviewing the test data shown below. Briefly, preweighed carbon steel coupons were precorroded in synthetic deaerated oilfield brine containing dissolved sulfides for approximately 18 hours. Deaeration was achieved by purging the brines with high purity nitrogen. The coupons were then transferred to fresh fluids to which the chlorine dioxide and any selected inhibitor had been added. After three hours, the coupons were removed from the chlorine dioxide solution, cleaned and weighed to measure the amount of corrosion which had occurred. The weight loss which occurred during the precorrosion step (2 to 3 mgs) is included in the reported weight losses. Tests were also conducted with direct carbon steel corrosion by chlorine dioxide without the precorrosion step. Additionally, a few tests were conducted with inhibitor added only during the precorrosion steps to simulate feeding between slugs of $ClO_2$.

A $ClO_2$ stock solution was made by acidifying a solution of $NaClO_2$ with a solution of HCl. This stock solution was added to the synthetic oilfield brine to yield approximately 400 ppm of $ClO_2$. Sulfide was added at approximately 10 ppm from a $Na_2S$ stock solution.

The results of initial tests are shown below in Table 1. As indicated earlier, testing was conducted comparing sodium bichromate and potassium permanganate both with and without precorrosion of the coupons.

TABLE 1

| Corrosion Inhibitor | PPM | Corrosion Inhibition Weight Loss in mgs. | |
|---|---|---|---|
| | | PreCorr(Sulfide) | Non-Precorr |
| Blank | | 31.5 | 25.8 |
| $MnO_4^-$ | 40 | 19.6 | |
| " | 100 | 11.2 | |
| " | 200 | 11.7 | 3.0 |
| $Cr_2O_7^=$ | 50 | 17.9 | |
| " | 100 | 15.3 | |
| " | 200 | 15.9 | 8.8 |

The results of these tests indicate that on an equal weight basis, permanganate is more effective than chromate as an inhibitor of $ClO_2$ corrosion. This conclusion applies to both sulfided and bare mild steel surfaces.

During these tests a voluminous, brown precipitate was observed in the bottles where precorroded coupons were treated with permanganate. This formation of solids is undesirable in certain oilfield water handling systems. In such instances, inhibition of solids precipitation or control of the particle size would be desirable. It was determined that permanganate reacts with residual $ClO_2^-$ in certain PH ranges to cause precipitation of $MnO_2$, manganese dioxide. $ClO_2^-$ can be present due to the inefficiency of the generator reaction or reaction of the $ClO_2$ with various "demand species". Several methods have been found to control the formation of solids and expand the utility of permanganate:

1) maintaining PH over 6.0,
2) use of phosphonate/copolymer blends,
3) precleaning of the system to be treated specifically by removal of existing corrosion products from the system before the addition of permanganate,
4) feed permanganate (or blends) between $ClO_2$ slugs (when permanganate alone is added, its concentration should be between 1:100 and 10:1 based on the permanganate:chlorine dioxide ratio),
5) use phosphonate only.

The formation of solids was demonstrated by forming a solution with 250 ppm permanganate and 200 ppm $ClO_2^-$. The pH was approximately 9.5 and no precipitate was observed. Upon adjustment of the pH down to approximately 6.0 with HCl, a smell of $ClO_2$ was noted and the solution turned brown and opaque over a 5 to 10 minute period.

A second test similar to that above was conducted but with 132 ppm of an AA/AHPSE copolymer and 67 ppm HEDP phosphonate in addition to the Permanganate and $ClO_2-$. The copolymer and phosphonate were added to the $ClO_2-$ solution and the PH was adjusted to approximately 8.1 with NaOH before addition of the permanganate. At pH approximately 8.1, the solution remained free of precipitate. Upon acidification to PH approximately 6.0 as above, the solution remained transparent but became reddish. After 5 to 10 minutes, the solution remained transparent but became brown.

In a $ClO_2$ treated system, the substantial dilution of the prepared solutions requires super-concentrating these solutions. If permanganate were applied by addition to the hydrochloric acid or waterflood slip stream used for C102 generation, then a several thousand ppm $ClO_2/ClO_2^-$ and a several hundred to several thousand ppm permanganate solution would exist in the generator and effluent line. Upon injection to the full waterflood flow, this solution would be diluted on the order of a hundred fold.

A series of tests was conducted to measure the effects of reaction time and concentration on solids production. To the $ClO_2$ stock solution used for corrosion tests (approximately 4000 ppm), either 400, 1000, or 2000 ppm permanganate was added. After either 30 seconds or 2 minutes reaction time, the solution was rapidly diluted a hundred fold. After an additional 2 hours, the solutions were filtered at 0.45 um, dried, and the w/w ppm of filterable solids was determined as shown in Table 2. Theoretical solids concentration is based on 100% conversion of the added permanganate to manganese dioxide. At low concentrations and short reaction times, solids productions are much less than theoretical. However, in all cases but one, undesirable solids are formed.

TABLE 2

Formation of Solids as a Function of Time and Concentrations*

| ppm $MnO_4^-$ | Solids, ppm | | |
|---|---|---|---|
| | 0.5 min. Reaction | 2 min. Reaction | Theoretical |
| 4 | 0[1] | +3 | 3 |
| 10 | +2 | +10 | 7 |
| 20 | +12 | +13 | 14 |

*ppm $MnO_4^-$ on a final dilution basis, 40 ppm $ClO_2$ was present upon final dilution. Theoretical solids weight based on 100% conversion of $MnO_4^-$ to $MnO_2$ and 100 gms total solution.
[1]Actual data showed a slight weight loss which would result in a "negative ppm" value, therefore, result expressed as no solids formed Various combinations of HEDP, AA/AHPSE and permanganate were evaluated in the corrosion test using the precorrosion step. The fluids from several of these tests were filtered at 0.2 um. The filter and precipitate were dried and weighed to measure the amount of solids produced with various treatments. The results are listed in Table 3. The data shows a 37% reduction in filterable solids weight and better corrosion inhibition by use of the HEDP, AA/AHPSE, and permanganate blend over an equal weight of permanganate alone. A large effect on particle size was visually evident by the turbidity of the solutions.

TABLE 3

| Corrosion Inhibition and Solids Formation | | | |
|---|---|---|---|
| Corrosion Inhibitor | PPM | Weight in mgs | |
| | | Corrosion | Solids |
| Blank | | 31.5 | 5.6 |
| $MnO_4^-$ | 40 | 19.6 | * |
| HEDP | 16+ | | |
| AA/AHPSE | 32+ | 16.2 | ** |
| $MnO_4^-$ | 40 | | |
| HEDP | 32+ | | |

TABLE 3-continued

Corrosion Inhibition and Solids Formation

| Corrosion Inhibitor | PPM | Weight in mgs | |
|---|---|---|---|
| | | Corrosion | Solids |
| AA/AHPSE | 64+ | 17.5 | *** |
| $MnO_4^-$ | 40 | | |
| $MnO_4^-$ | 200 | 11.7 | 24.8 |
| HEDP | 160+ | | |
| AA/AHPSE | 320+ | 7.9 | 18.1 |
| $MnO_4^-$ | 200+ | | |
| $Cr_2O_7^=$ | 200 | 15.9 | 0.5 |

NOTES:
*Turbid, settled solids
**Slightly turbid, some settled solids
***Very slightly turbid, no settled solids
HEDP = 1-hydroxyethylene diphosphonic acid
AA/AHPSE = Acrylic acid/allyl hydroxypropyl sulfonate ether To simulate treatment of a clean system, corrosion inhibition and solids formation tests were conducted on coupons which were not precorroded. To simulate treatment with corrosion inhibitor between $ClO_2$ slugs, the precorrosion step was conducted with inhibitor present. The subsequent $ClO_2$ corrosion step utilized untreated fluids. These data are presented in Table 4 compared to data from previous tables where inhibitor was added to the $ClO_2$ corrosion step. The HEDP, AA/AHPSE, and permanganate blend was used for these tests. That blend exhibited corrosion protection better or similar to $Cr_2O_7^{31\ 2}$ with similar amounts of solids in both alternate methods of treatment application.

Testing of other non-nitrogen containing phosphonates (Table 5) indicates that all show efficacy, although they are much less effective than either $Cr_2O_7^{-2}$ or permanganate at 200 ppm. Performance similar to the oxidizing anions is obtained in the vicinity of 700 ppm. Solids were not observed to form during these tests.

TABLE 4

Corrosion Inhibition and Solids Formation

| Corrosion Inhibitor | PPM | Weight Loss (mgs)/Solids (mgs) | | |
|---|---|---|---|---|
| | | Precorroded Treated | Not Precorroded Treated | Precorroded With Treatment |
| Blank | | 31.5/5.5 | 25.8/2.1 | 31.5/5.5 |
| $Cr_2O_7$ | 200 | 15.9/0.5 | 8.8/1.7 | 4.2/0 |
| $MnO_4$ | 200 | 11.7/24.8 | | |
| HEDP | 160+ | | | |
| AA/AHPSE | 320+ | 7.9/18.1 | 3.0/2.6 | 6.0/0 |
| $MnO_4$ | 200 | | | |

Notes:
HEDP = 1-hydroxyethylene diphosphonic acid
AA/AHPSE = Acrylic acid/allyl hydroxypropyl sulfonate ether

TABLE 5

| Corrosion Inhibitor | PPM | Corrosion Inhibition Weight Loss (mgs) |
|---|---|---|
| Blank | | 31.5 |
| HEDP | 200 | 24.9 |
| HEDP | 700 | 13.7 |
| PHAA | 250 | 21.0 |
| PHAA | 700 | 13.6 |
| TCPB | 200 | 23.2 |
| TCPB | 700 | 18.1 |

TABLE 5-continued

| Corrosion Inhibitor | PPM | Corrosion Inhibition Weight Loss (mgs) |
|---|---|---|
| PCAP | 200 | 25.2 |
| PCAP | 700 | 17.2 |
| AA/AHPSE | 320 | 33.8 |

Notes:
HEDP = 1-hydroxyethylene diphosphonic acid
PHAA = Phosphonohydroxyacetic Acid
TCPB = 1,2,4-tricarboxy-2-phosphonobutane
AA/AHPSE = Acrylic acid/allyl hydroxypropyl sulfonate ether

DISCUSSION

In oilfield waterflood systems chlorine dioxide is used to control sulfides and sulfate reducing bacteria. However, chlorine dioxide is also known as being very corrosive metallic components used in oilfield processing equipment. Conventional treatment programs utilized to control chlorine dioxide corrosion have included chromates, usually in the form of sodium bichromate. Although chromates are effective for this purpose they are highly toxic and they have also come under severe scrutiny in many states. In at least one state, California, their use is severely curtailed.

The instant invention solves the aforementioned problem by providing a treatment program exhibiting high chlorine dioxide corrosion control efficiency. Under the simulated oilfield test conditions shown above, equal concentrations of chromate are shown to be less effective as a corrosion inhibitor than permanganate alone or when the permanganate is incorporated into the compositions of the instant invention.

While this invention has been described with respect to particular embodiments thereof, it is apparent that numerous other forms and modifications of this invention will be obvious to those skilled in the art. The claims generally should be construed to cover all such obvious forms and modifications which are within the true spirit and scope of the present invention.

We claim:

1. A method of inhibiting corrosion by chlorine dioxide in oilfield waterflood systems by adding a sufficient amount of a corrosion inhibiting composition comprising a phosphonate, a copolymer consisting of repeating units of acrylic acid/allyl hydroxy propyl sulfonate ether, and a permangante.

2. A method according to claim 1 wherein said phosphonate is 1-hydroxyethylidene diphosphonic acid or salt thereof.

3. A method according to claim 1 wherein said copolymer consists of the repeat units of acrylic acid/allyl hydroxy propyl sulfonate ether in the molar ratios of from about 30:1 to 1:20.

4. A method according to claim 1 wherein the molar ratio of said copolymer is between 10:1 and 1:5.

5. A method according to claim 1 wherein said permanganate is potassium permanganate.

6. A method according to claim 1 wherein the weight ratio of said phosphonate/copolymer/permanganate composition is 1/2/1.25.

7. A method according to claim 1 wherein said phosphonate/copolymer/permanganate composition is added in an amount such that the concentration ratio of permanganate/chlorine dioxide is between 1/100 and 10/1.

* * * * *